(12) United States Patent
Kim et al.

(10) Patent No.: US 9,864,056 B2
(45) Date of Patent: Jan. 9, 2018

(54) MATCHING SYSTEM BETWEEN CONVECTIVE CELL IN WEATHER RADAR IMAGE AND LIGHTNING AND CONTROL METHOD THEREOF

(71) Applicant: Korea Meteorological Administration, Seoul (KR)

(72) Inventors: Ji Young Kim, Bucheon-si (KR); Jeong Seok Ko, Seoul (KR); Hi Jun Yang, Seoul (KR); Tae Sun Kwon, Yongin-si (KR); Seung Jun Oh, Seoul (KR); Jeong Deok Lee, Seoul (KR); Mi Young Park, Tongyeong-si (KR); Gyu Won Lee, Daegu (KR); Sung Hwa Jung, Daegu (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 289 days.

(21) Appl. No.: 14/848,155

(22) Filed: Sep. 8, 2015

(65) Prior Publication Data
US 2016/0154101 A1    Jun. 2, 2016

(30) Foreign Application Priority Data
Nov. 27, 2014 (KR) .......................... 10-2014-0167726

(51) Int. Cl.
G01S 13/95 (2006.01)
G01S 7/06 (2006.01)

(52) U.S. Cl.
CPC ............... *G01S 13/953* (2013.01); *G01S 7/06* (2013.01)

(58) Field of Classification Search
CPC ................................. G01S 13/953; G01S 7/06
See application file for complete search history.

(56) References Cited

U.S. PATENT DOCUMENTS 7,558,674 B1 * 7/2009 Neilley ................... G01W 1/02
  702/3
9,116,244 B1 * 8/2015 West ..................... G01S 13/953
(Continued)

FOREIGN PATENT DOCUMENTS

| JP | 2001-183473 | 6/2001 |
| KR | 10-0931950 B1 | 7/2009 |
| KR | 10-20120119750 A | 10/2012 |

OTHER PUBLICATIONS

F. F Junyent and V. Chandrasekar, "Weather Radar Network Design," IGARSS 2008—2008 IEEE International Geoscience and Remote Sensing Symposium, Boston, MA, 2008, pp. IV-1022-IV-1025.*

(Continued)

*Primary Examiner* — John B Sotomayor
(74) *Attorney, Agent, or Firm* — Lucem, PC; Heedong Chae

(57) ABSTRACT

The present invention discloses a matching system between a convective cell in a weather radar image and lightning, and a control method thereof. In other words, according to the invention, convective cells are detected in a weather radar image, lightning is detected through a total lightning detection system, and the detected lightning is matched with the detected convective cells in the weather radar image. Therefore, it is possible to rapidly and accurately match and confirm a lightning-generated convective cell of a plurality of convective cells.

6 Claims, 10 Drawing Sheets
(3 of 10 Drawing Sheet(s) Filed in Color)

(56) References Cited

U.S. PATENT DOCUMENTS

| | | | | |
|---|---|---|---|---|
| 2013/0345982 A1* | 12/2013 | Liu | ........................ | G01W 1/16 |
| | | | | 702/4 |
| 2014/0324351 A1* | 10/2014 | Dannevik | ............... | G01W 1/10 |
| | | | | 702/3 |
| 2014/0362088 A1* | 12/2014 | Veillette | .................. | G01S 7/062 |
| | | | | 345/441 |
| 2015/0310747 A1* | 10/2015 | Frolik | .................... | B64D 45/00 |
| | | | | 340/971 |
| 2015/0339930 A1* | 11/2015 | McCann | ............. | G08G 5/0039 |
| | | | | 701/528 |
| 2016/0154101 A1* | 6/2016 | Kim | ...................... | G01S 13/953 |
| | | | | 342/26 R |
| 2017/0067992 A1* | 3/2017 | Kim | ...................... | G01S 13/951 |

OTHER PUBLICATIONS

J. Montanyà, O. van der Velde, A. Domingo-Dalmau, N. Pineda, O. Argemí and A. Salvador, "Lightning mapping observations of downward lightning flashes to wind turbines," 2016 33rd International Conference on Lightning Protection (ICLP), Estoril, 2016, pp. 1-6.*

J. P. Chamberlain and K. A. Latorella, "Convective weather detection by general aviation pilots with conventional and data-linked graphical weather information sources," 20th DASC. 20th Digital Avionics Systems Conference (Cat. No. 01CH37219), Daytona Beach, FL, 2001, pp. 6A3/1-6A3/12 vol. 2.*

* cited by examiner

| MONTH/DAY/YEAR | HOUR/MINUTE/SECOND | LATITUDE | LONGITUDE | STRENGTH | M | CE1 | CE2 | CEE | CEA | CHI | NRS | T |
|---|---|---|---|---|---|---|---|---|---|---|---|---|
| 12/31/08 | 00:02:17.563 | 35.9076 | 129.6120 | +7.3 | 0 | 26.5 | 1.4 | 18.9 | 88 | 1.2 | 2 | 6 |
| 12/31/08 | 00:25:58.003 | 35.9860 | 129.4994 | -10.7 | 0 | 21.5 | 1.4 | 15.4 | 86 | 11.1 | 2 | 6 |
| 12/31/08 | 00:32:45.370 | 35.8793 | 129.6805 | -14.2 | 0 | 23.5 | 1.4 | 16.8 | 89 | 7.8 | 2 | 6 |
| 12/31/08 | 00:55:00.901 | 36.0783 | 130.1945 | +9.2 | 0 | 47.5 | 1.9 | 25.0 | 84 | 0.7 | 2 | 6 |
| 12/31/08 | 01:36:05.085 | 35.8511 | 129.5038 | -9.6 | 0 | 21.1 | 1.3 | 16.2 | 90 | 6.0 | 2 | 6 |
| 12/31/08 | 01:36:55.312 | 36.1247 | 129.7682 | -11.9 | 0 | 30.4 | 1.7 | 17.9 | 82 | 3.1 | 2 | 6 |

FIG. 2

MATCHING SYSTEM BETWEEN CONVECTIVE CELL IN WEATHER RADAR IMAGE AND LIGHTNING AND CONTROL METHOD THEREOF

CROSS-REFERENCES TO RELATED APPLICATION

This application claims the benefit of Korean Application No. 10-2014-0167726 filed on Nov. 27, 2014 with the Korean Intellectual Property Office, the disclosure of which is incorporated herein by reference.

BACKGROUND OF THE INVENTION

1. Field of the Invention

The present invention relates to a matching system between a convective cell in a weather radar image and lightning and a control method thereof, and more particularly, to a matching system between a convective cell in a weather radar image and lightning and a control method thereof, in which convective cells are detected in a weather radar image, lightning is detected through a total lightning detection system, and the detected lightning is matched with the detected convective cells in the weather radar image.

2. Description of the Related Art

A weather radar is an equipment which emits an electromagnetic wave and then calculates a magnitude of an electric wave reflected or diffused from a meteorological target, and is one of remote sensing equipments which monitors a wide area (for example, an effective observation radius of about 240 km) very rapidly (for example, every 10 minutes) and calculates a rainfall of the wide area.

Such a weather radar only detects convective cells in the monitoring area, and does not provide a method of confirming a convective cell generating the lightning of the convective cells.

PRIOR ART DOCUMENT

Patent Document (Patent Document 1) Korean Registered Patent No. 10-0931950, titled "METHOD OF CLASSIFYING RAINFALL TYPE OF WEATHER RADAR"

SUMMARY OF THE INVENTION

An object of the invention is to provide a matching system between a convective cell in a weather radar image and lightning and a control method thereof, in which convective cells are detected in a weather radar image, lightning is detected through a total lightning detection system, and the detected lightning is matched with the detected convective cells in the weather radar image.

A matching system between a convective cell in a weather radar image and lightning according to an embodiment of the invention, which matches a convective cell detected in a weather radar image with detected lightning, may include: a total lightning detection system (TLDS) that collects data about generated lightning, analyzes the collected data about lightning, and transmits the analyzed lightning information; a weather radar center system that detects one or more convective cells present in a radar image detected through a weather radar, and transmits information about one or more detected convective cells; and a terminal that confirms whether there is a convective cell overlapped with an ellipse interface of lightning corresponding to the lightning information in a convective cell range included in the received information about one or more convective cells, determines that the overlapped lightning is generated from the overlapped convective cell when there is the convective cell overlapped with the ellipse interface of the lightning corresponding to the lightning information in one or more convective cell ranges as the confirmation result, and matches the overlapped lightning information with the convective cell.

The total lightning detection system as an example according to the invention may collect data about generated lightning through a TOA (time of arrival) sensor, may filter data in which the number of sensors observing a lightning phenomenon is three or more in the lightning data corresponding to a lightning type for cloud and ground as a lightning data type on the basis of properties of the TOA sensor, and may transmit the filtered lightning information to the terminal.

A control method of a matching system between a convective cell in a weather radar image and lightning according to an embodiment of the invention, which matches a convective cell detected in a weather radar image with detected lightning, may include: collecting, through a total lightning detection system, data about generated lightning, analyzing the collected data about lightning, and transmitting the analyzed lightning information to the terminal; detecting, through a weather radar center system, one or more convective cells present in a detected radar image, and transmitting the information about one or more detected convective cells to the terminal; confirming, through the terminal, whether there is a convective cell overlapped with an ellipse interface of lightning corresponding to the lightning information in a convective cell range included in the received information about one or more convective cells; determining, through the terminal, that the overlapped lightning is generated from the overlapped convective cell when there is the convective cell overlapped with the ellipse interface of the lightning corresponding to the lightning information in one or more convective cell ranges as the confirmation result, and matching the overlapped lightning information with the convective cell.

The detecting of one or more convective cells present in the detected radar image as an example according to the invention may include: generating a 3-dimensional CAPPI through the weather radar center system; and distinguishing, through the weather radar center system, a reflectivity cell related to risk weather.

The generating of the 3-dimensional CAPPI as an example according to the invention may include: collecting radar reflectivity data; displaying the collected radar reflectivity data on a polar coordinate system by radar volume data; and performing coordinate conversion for the radar volume data.

The distinguishing of the reflectivity cell related to the risk weather as an example according to the invention may include: determining all grid elements having a reflectivity more than a preset threshold value of reflectivity in 3-dimensional radar reflectivity data, and giving individual identification numbers to all the determined grid elements; searching x coordinates and y coordinates of all the grid elements, determines grid elements, the y coordinates of which are the same and the x coordinates are adjacent, as 1-dimensional segments, and giving identification numbers to the determined 1-dimensional segments; searching y coordinates of all the 1-dimensional segments, and determining 1-dimensional segments, y coordinates of which are adjacent, as 2-dimensional components; searching al the 2-dimensional components in a z direction that is a vertical direction, and determining 2-dimensional components, z coordinates of which are adjacent, as a 3-dimensional reflectivity cell; confirming whether there is a value smaller than a volume threshold value in the 3-dimensional radar reflectivity cell; excluding, when there is the 3-dimensional component with a volume smaller than the volume threshold value as the confirmation result, the 3-dimensional component with the volume smaller than the volume threshold value in the final determination projecting, when there is a 3-dimensional component with a volume equal to or larger than the volume threshold value as the confirmation result, the 3-dimensional component with the volume equal to or larger than the volume threshold value onto an x-y plane, determining it as a 2-dimensional reflectivity cell, detecting a 3-dimensional reflectivity cell corresponding to a 3-dimensional component with a volume equal to or larger than the volume threshold value as a convective cell; calculating 3-dimensional property information and 2-dimensional property information from the 3-dimensional reflectivity cell and the 2-dimensional reflectivity cell; and displaying a CMAX (column maximum) image and a storm 2D image on the basis of the detected convective cell and the calculated property information.

According to the invention, convective cells are detected in a weather radar image, lightning is detected through a total lightning detection system, and the detected lightning is matched with the detected convective cells in the weather radar image. Therefore, it is possible to rapidly and accurately match and confirm a lightning-generated convective cell of a plurality of convective cells.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a diagram illustrating collected data about lightning according to an embodiment of the invention.

DETAILED DESCRIPTION OF THE PREFERRED EMBODIMENTS

Figure 1:
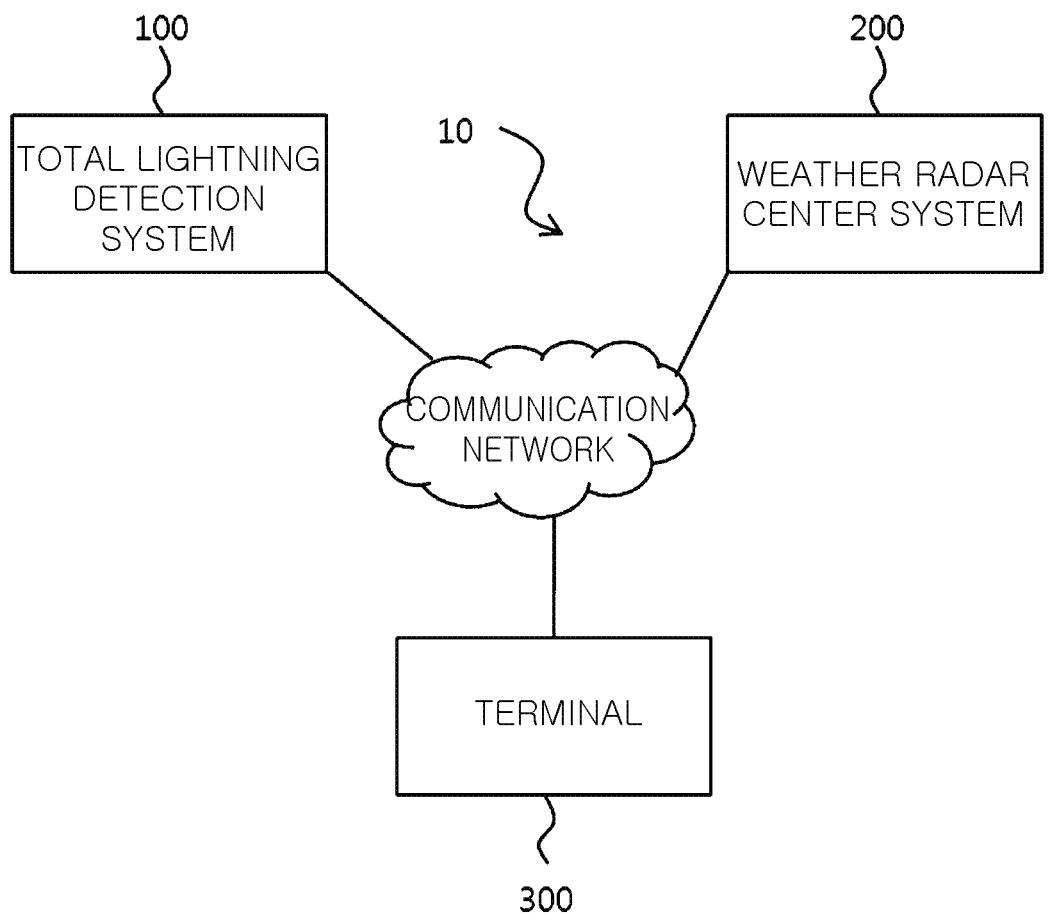
FIG. 1 is a block diagram illustrating a configuration of a matching system between a convective cell in a weather radar image and lightning according to an embodiment of the invention.

Technical terms used in the invention are used merely to describe a specific embodiment, and it should be noted that they do not restrict the invention. In addition, technical terms used in the invention should be interpreted as the meaning generally understood by those skilled in the art unless they are defined particularly as the other meaning in the invention, and they should not be interpreted as excessively comprehensive meaning or excessively contracted meaning. In addition, when technical terms used in the invention are wrong technical terms which do not accurately express the spirit of the invention, they should be substituted and understood by technical terms which those skilled in the art can rightly understand. In addition, general terms used in the invention should be interpreted according to definition in dictionaries or according to context before and after, and should not be interpreted as excessively contracted meaning.

In addition, singular expression used in the invention includes plural expression unless it is not clearly different on context. In the invention, terms such as "comprise" and "include" should not be interpreted as necessarily including all various constituent elements or various steps described in the invention, and should be interpreted as that some constituent elements or some steps of them may not be included or additional constituent elements or steps may be further included.

In addition, terms including ordinals such as "first" and "second" used in the invention may be used to describe constituent elements, but the constituent elements should not be restricted by the terms. Terms are used only to distinguish one constituent element from the other constituent elements. For example, a first constituent element may be named as a second constituent element while not deviating from a right scope of the invention, and similarly, the second constituent element may be also named as the first constituent element.

Hereinafter, preferred embodiments according to the invention will be described in detail, the same reference numerals are given to the same or similar constituent elements irrespective of the drawing signs, and the repeated description thereof is omitted.

In addition, in the description of the invention, when it is determined that specific description about the related known technique may blur the gist of the invention, detailed description thereof is omitted. In addition, the accompanying drawings are only to easily understand the spirit of the invention, and it should not be interpreted that the spirit of the invention is restricted by the accompanying drawings.

FIG. 1 is a block diagram illustrating a configuration of a matching system 10 between a convective cell in a weather radar image and lightning according to an embodiment of the invention.

As illustrated in FIG. 1, the matching system 10 between a convective cell in a weather radar image and lightning includes a total lightning detection system 100, a weather radar center system 200, and a terminal 300. All constituent elements of the matching system 10 between a convective cell in a weather radar image and lightning illustrated in FIG. 1 are not essential constituent elements, and the matching system 10 between a convective cell in a weather radar image and lightning may be embodied by constituent elements more than the constituent elements illustrated in FIG.

1, and the matching system 10 between a convective cell in a weather radar image and lightning may be embodied even by constituent elements less than those.

The total lightning detection system (TLDS) 100 is a system which objectively and quantitatively detects a lightning phenomenon.

Further, when lightning is generated, the total lightning detection system 100 detects the generated lightning.

In other words, the total lightning detection system 100 collects (detects or measures) data about generated lightning through a TOA (time of arrival) sensor (not illustrated).

For example, as illustrated in FIG. 2, the total lightning detection system 100 collects data about lightning through the TOA sensor. Herein, CE1 (confidence ellipse 1) represents a length (unit: km) of a semi-major axis of a confidence ellipse, CE2 represents a length (unit: km) of a semi-minor axis of a confidence ellipse, CEE (eccentricity of confidence ellipse) represents an eccentricity of a confidence ellipse, CEA (confidence ellipse angle) represents a confidence ellipse angle in a longitude direction on the north, CHI represents a chi-square value of stroke, NRS represents the number of reported sensors, and T represents a type of lightning "C" with respect to cloud and represents a type of lightning "G" about cloud-ground.

In addition, the total lightning detection system 100 analyzes the collected data about lightning. In this case, the total lightning detection system 100 uses (or filters) only data in which the number of sensors (or NRS) detecting a lightning phenomenon is three or more, in the cloud-ground lightning data, the type of the lightning data of which is represented by G, on the basis of the property of the TOA sensor. In addition, the total lightning detection system 100 may exclude positive polarity lightning in which electric current is equal to or less than a preset value (for example 10 kA) in cloud-ground discharge.

In addition, the total lightning detection system 100 transmits the analyzed (or detected) lightning information to the terminal 300.

The weather radar center system 200 detects one or more convective cells presented in a radar image detected (captured, collected, observed, or sensed) through a weather radar (not illustrated).

In other words, the weather radar center system 200 generates a 3-dimensional CAPPI (constant altitude plan position indicator), and distinguishes a reflectivity cell related to risk weather. In this case, the generating of the 3-dimensional CAPPI is a step of performing coordinate conversion of radar reflectivity data. In addition, the distinguishing of the reflectivity cell related to the risk weather is a step of detecting a convective cell (or a convective storm) from the coordinate-converted 3-dimensional CAPPI data, and quantifying and providing a property of the detected convective cell.

Figure 3:
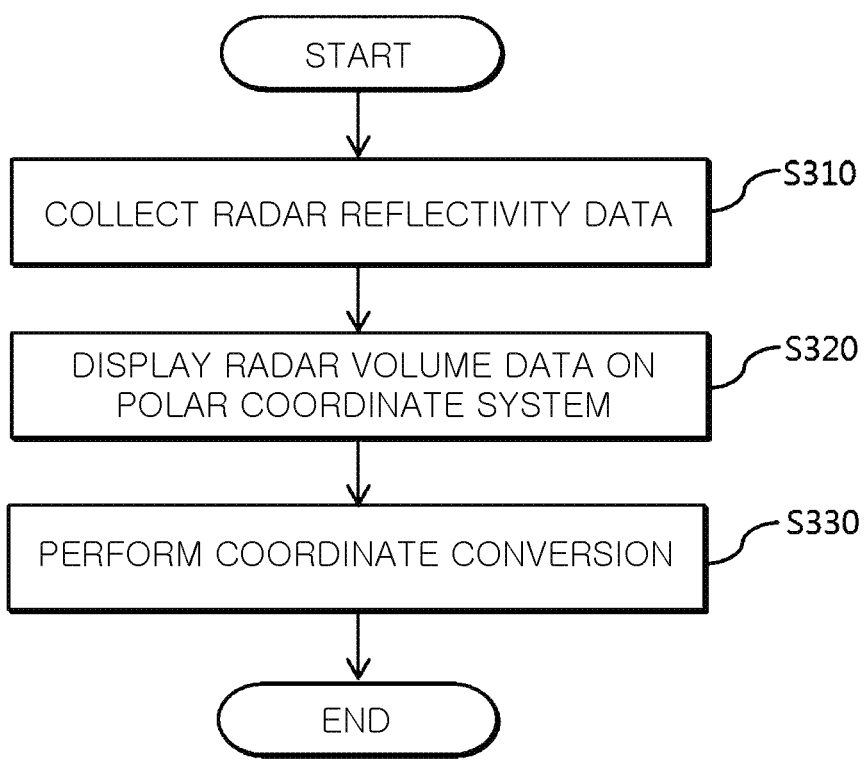
FIG. 3 is a flowchart illustrating a procedure of generating 3-dimensional CAPPI according to an embodiment of the invention.

Herein, the process of generating the 3-dimensional CAPPI is performed as illustrated in FIG. 3.

The weather radar center system 200 collects radar reflectivity data (S310).

In addition, the weather radar center system 200 displays the collected radar reflectivity data on a polar coordinate system by radar volume data (S320).

In addition, the weather radar center system 200 performs coordinate conversion for the radar volume data. In other words, the weather radar center system 200 converts the radar volume data displayed on the polar coordinate system into a 3-dimensional reflectivity field of an orthogonal coordinate system (S330).

Accordingly, the weather radar center system 200 generates 3-dimensional CAPPI (or grid) data.

Figure 4:
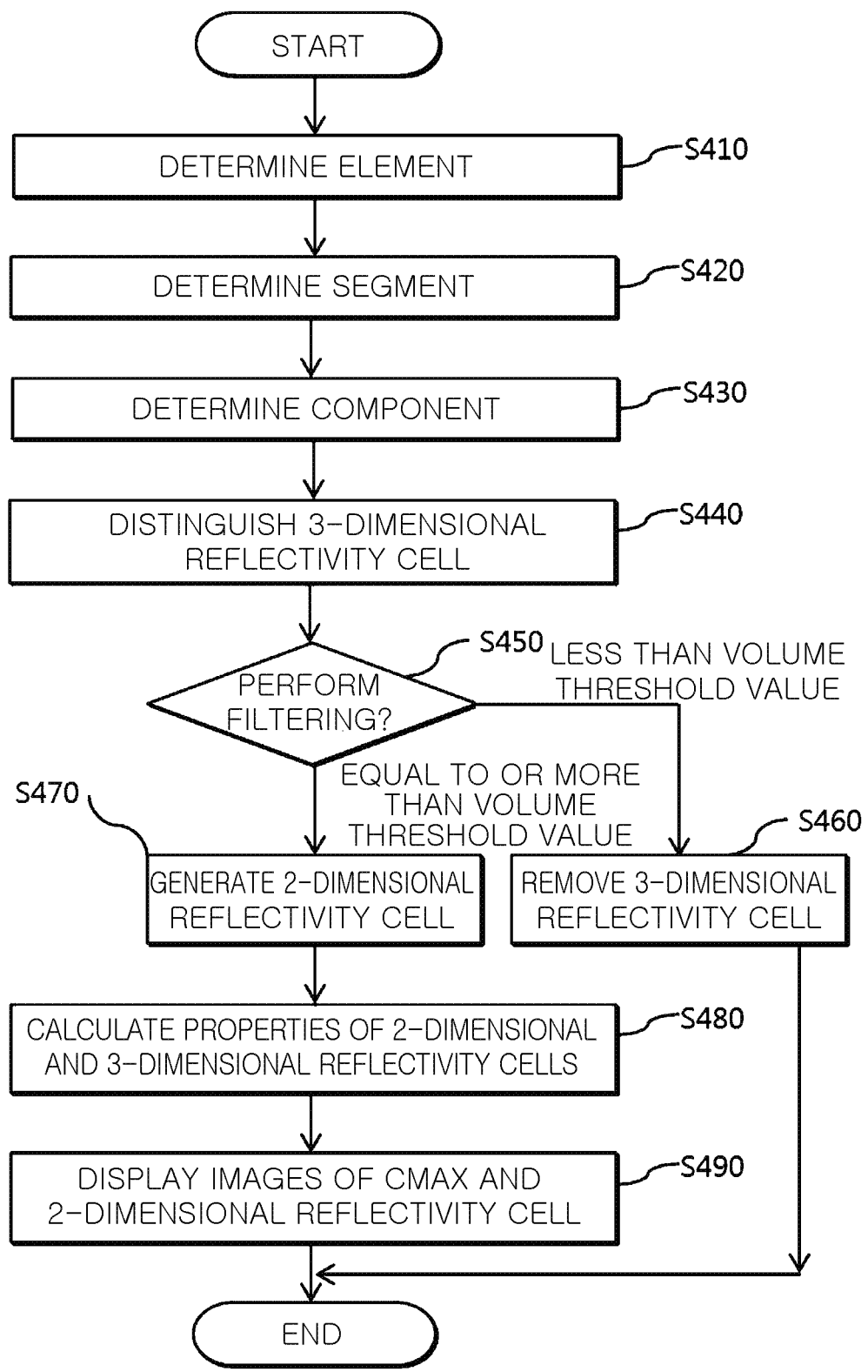
FIG. 4 is a flowchart illustrating a procedure of distinguishing a reflectivity cell related to risk weather according to an embodiment of the invention.

In addition, the process of distinguishing the reflectivity cell related to the risk weather is performed as illustrated in FIG. 4.

The weather radar center system 200 detects a convective storm from the 3-dimensional CAPPI data gradually distinguishing a 1-dimensional segment, a 2-dimensional component, and a 3-dimensional component (storm 3D) from the grid elements. In this case, the determination of the grid elements uses a preset reflectivity threshold value.

In other words, the weather radar center system 200 determines all the grid elements having reflectivity more than the reflectivity threshold value in the 3-dimensional radar reflectivity data, gives (or sets) individual identification numbers to all the determined grid elements, and determines the elements (S410).

In addition, the weather radar center system 200 searches x coordinates and y coordinates of all the grid elements, determines grid elements, y coordinates of which are the same and x coordinates are adjacent, as 1-dimensional segments, and gives identification numbers to the determined 1-dimensional segments (S420).

In addition, the weather radar center system 200 searches y coordinates of all the 1-dimensional segments, and determines 1-dimensional segments, y coordinates of which are adjacent, as 2-dimensional components (S430).

In addition, the weather radar center system 200 searches all the 2-dimensional components in a z direction (or a vertical direction), and determines 2-dimensional components, z coordinates of which are adjacent, as 3-dimensional components (storm 3D), that is, 3-dimensional reflectivity cells (S440).

As described above, the weather radar center system 200 uses a preset threshold method to determine the reflectivity cell (or the convective cell) related to the risk weather (for example, including thunderstorm, hailstone, downpour, and the like) in the 3-dimensional radar reflectivity data. In the embodiment of the invention, the convective cell is determined using the reflectivity threshold value and the volume threshold value.

In addition, the weather radar center system 200 performs filtering on the basis of the volume threshold value preset for the 3-dimensional radar reflectivity cell.

In other words, the weather radar center system 200 confirms (determines or filters) whether there is a value smaller than the volume threshold value in the 3-dimensional radar reflectivity cells (S450).

When there is a 3-dimensional component (storm 3D) with a volume smaller than the volume threshold value as the confirmation result, the weather radar center system 200 excludes the 3-dimensional component with a volume smaller than the volume threshold value in the final determination (S460).

In addition, when there is a 3-dimensional component with a volume equal to or more than the volume threshold value as the confirmation result, the weather radar center system 200 projects the 3-dimensional component onto an x-y plane, and determines it as a 2-dimensional reflectivity cell (storm 2D).

In other words, the weather radar center system 200 projects the determined 3-dimensional component (storm 3D) onto the 2-dimensional x-y plane, converts it into a 2-dimensional reflectivity cell, and displays the converted 2-dimensional reflectivity cell. In this case, the 3-dimensional reflectivity cell with a volume larger than the volume threshold value is detected as a convective cell, and the 2-dimensional reflectivity cell is displayed as an ellipse (S470).

In addition, the weather radar center system 200 calculates, from the 3-dimensional reflectivity cell and the 2-dimensional reflectivity cell, 3-dimensional property information (for example, including 3-dimensional center position, volume, maximum reflectivity, average reflectivity, altitude and position of maximum reflectivity, and the like) and 2-dimensional property information (for example, including area, center position, lengths of major axis and minor axis of representative ellipse, inclination of major axis, vertically integrated liquid-water content, vertically integrated liquid-water content density, upper layer vertically integrated liquid-water content, and the like), and provide quantitative numerical information (S480).

In addition, the weather radar center system 200 displays a CMAX (column maximum) image and a storm 2D image on the basis of the detected convective cell and the calculated property information. In this case, the CMAX image is that only the strongest echo part in each column of volume detection data is expressed on a plane (S490).

As described above, the weather radar center system 200 can calculate a property of the determined 3-dimensional reflectivity cell through the filtering of the determined 3-dimensional reflectivity cell, the conversion into the 2-dimensional reflectivity cell, and the process of calculating property information from each of the 2-dimensional and 3-dimensional reflectivity cells.

In addition, the weather radar center system 200 transits the information about one or more detected convective cells to the terminal 300.

The terminal 300 may be applied to various terminals such as smart phone, portable terminal, mobile terminal, personal digital assistant (PDA), PMP (portable multimedia player) terminal, telematics terminal, navigation terminal, personal computer, laptop computer, slate PC, tablet PC, ultrabook, wearable device (for example, including smart watch, smart glass, HMD (head mounted display), and the like), Wibro terminal, IPTV (internet protocol television) terminal, smart TV, digital broadcasting terminal, AVN (audio video navigation) terminal, A/V (audio/video) system, and flexible terminal.

Figure 5:
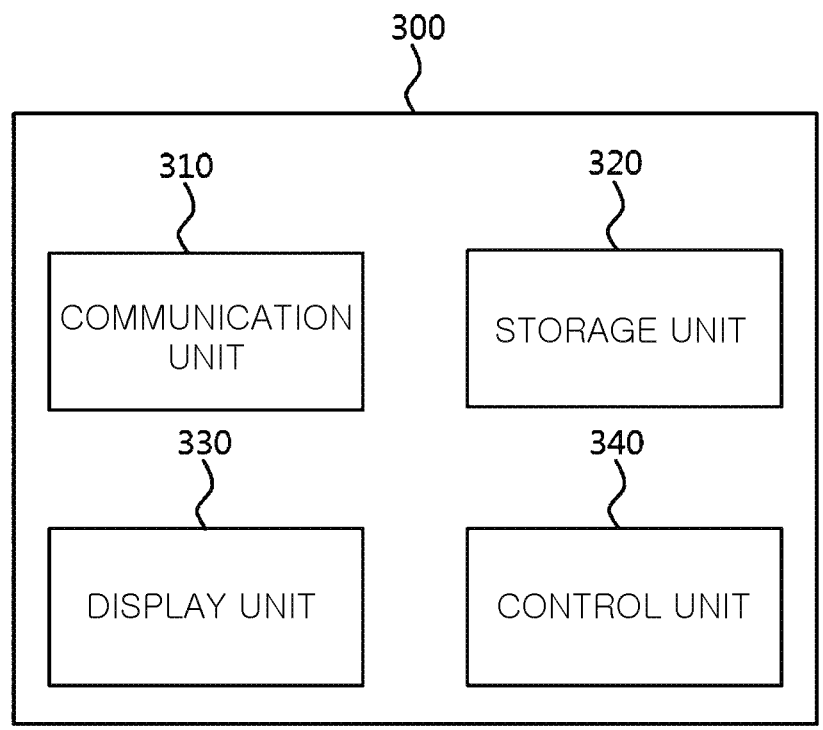
FIG. 5 is a block diagram illustrating a configuration of a terminal according to an embodiment of the invention.

In addition, as illustrated in FIG. 5, the terminal 300 includes a communication unit 310, a storage unit 320, a display unit 330, and a control unit 340. All the constituent elements of the terminal 300 illustrated in FIG. 5 are not essential constituent elements, the terminal 300 may be embodied by constituent elements more than the constituent elements illustrated in FIG. 5, and the terminal 300 may be embodied by constituent elements less than those.

The communication unit 310 is connected in communication to an internal arbitrary constituent element or at least one arbitrary external terminal through wire/wireless communication network. In this case, the arbitrary external terminal may include the total lightning detection system 100, the weather radar center system 200, and the like. In this case, a wireless internet technique may include wireless LAN (WLAN), Wibro (Wireless Broadband), Wimax (world, interoperability for microwave access), HSDPA (high speed downlink packet access), IEEE 802.16, long term evolution (LTE), wireless mobile broadband service (WMBS), and the like. In addition, a short-range communication technique may include Bluetooth, Wi-Fi, RFID (radio frequency identification), infrared data association (IrDA), UWB (ultra wideband), ZigBee, near field communication (NFC), ultra sound communication (USC), visible light communication (VLC), BLE (Bluetooth Low energy), and the like. In addition, a wire communication technique may include power line communication (PLC), USB communication, Ethernet, serial communication, optical/coaxial cable, and the like.

In addition, the communication unit 310 can transmits and receives information to and from the terminal through a universal serial bus (USB).

In addition, the communication unit 310 receives the analyzed lightning information transmitted from the total lightning detection system 100.

In addition, the communication unit 319 receives the information about one or more detected convective cells transmitted from the weather radar center system 200.

The storage unit 320 stores various user interface (UI), graphic user interface (GUI), and the like.

In addition, the storage unit 320 stores data and programs necessary to operate the terminal 300.

In addition, the storage unit 320 may include at least one storage medium of flash memory type, hard disk type, multimedia card micro type, card type memory (for example, SB or XD memory, and the like), magnetic memory, magnetic disk, optical disk, RAM (random Access memory, SRAM (static random access memory), ROM (read-only memory), EEPROM (electrically erasable programmable read-only memory), and PROM (programmable read only memory). In addition, the terminal 300 may operate a web storage which performs a storage function of the storage unit 320 on the internet, or may be operated in association with the web storage.

In addition, the storage unit 320 stores the analyzed lightning information received through the communication unit 310, the information about one or more detected convective cells, and the like.

The display unit 330 can display various contents such as various menu screens using the user interface and/or the graphic user interface stored in the storage unit 320 by the control of the control unit 340. In this case, the contents displayed on the display unit 330 include various texts or image data (including various kinds of information data) and a menu screen including data such as icons, list menu, and combo box. In addition, the display unit 330 may be a touch screen.

In addition, the display unit 330 may include at least one of a liquid crystal display (LCD), a thin film transistor-liquid crystal display (TFT LCD), an organic light-emitting diode (OLED), a flexible display, a 3D display, an e-ink display, and an LED (light emitting diode).

In addition, the display unit 330 displays the analyzed lightning information and the information about one or more detected convective cells received through the communication unit 310 by the control of the control unit 340.

The control unit 340 performs an overall control function of the terminal 300.

In addition, the control unit 340 confirms (or determines) whether there is a convective cell overlapped with (or including) an ellipse interface of lightning corresponding to the lightning information in the convective cell range included in the information about one or more received convective cells. In this case, the control unit 340 uses a center position, a major axis, a minor axis, and a major axis rotation angle projected 2-dimensionally in a case of the convective cell, and uses a center position, a major axis, a minor axis, and an ellipse angle of lightning in a case of the lightning.

When there is a convective cell overlapped with an ellipse interface of lightning corresponding to the lightning information in one or more convective cell ranges as the confirmation result (or the determination result), the control unit 340 determines that the lightning corresponding to the lightning information is generated from the overlapped convective cell, and matches the lightning information (or the lightning corresponding to the lightning information) with the convective cell.

In addition, the control unit 340 stores the information about the matched lightning information and convective cell in the storage unit 320. In this case, the control unit 340 accumulates the number of lightning generation times for each convective cell, and stores it in the storage unit 320. In addition, the control unit 340 displays the accumulated number of lightning generation times for each convective cell on the display unit 330.

In addition, when there is no convective cell overlapped with the ellipse interface of the lightning corresponding to the lightning information in one or more convective cell ranges as the confirmation result, the control unit 340 determines that the lightning is not generated in one or more convective cell ranges.

As described above, the convective cells are detected in the weather radar image, the lightning is detected through the total lightning detection system, and the detected lightning can be matched with the detected convective cells in the weather radar image.

Hereinafter, a control method of a matching system between a convective cell in a weather radar image and lightning according to the invention will be described in detail with reference to FIG. 1 to FIG. 11.

Figure 6:
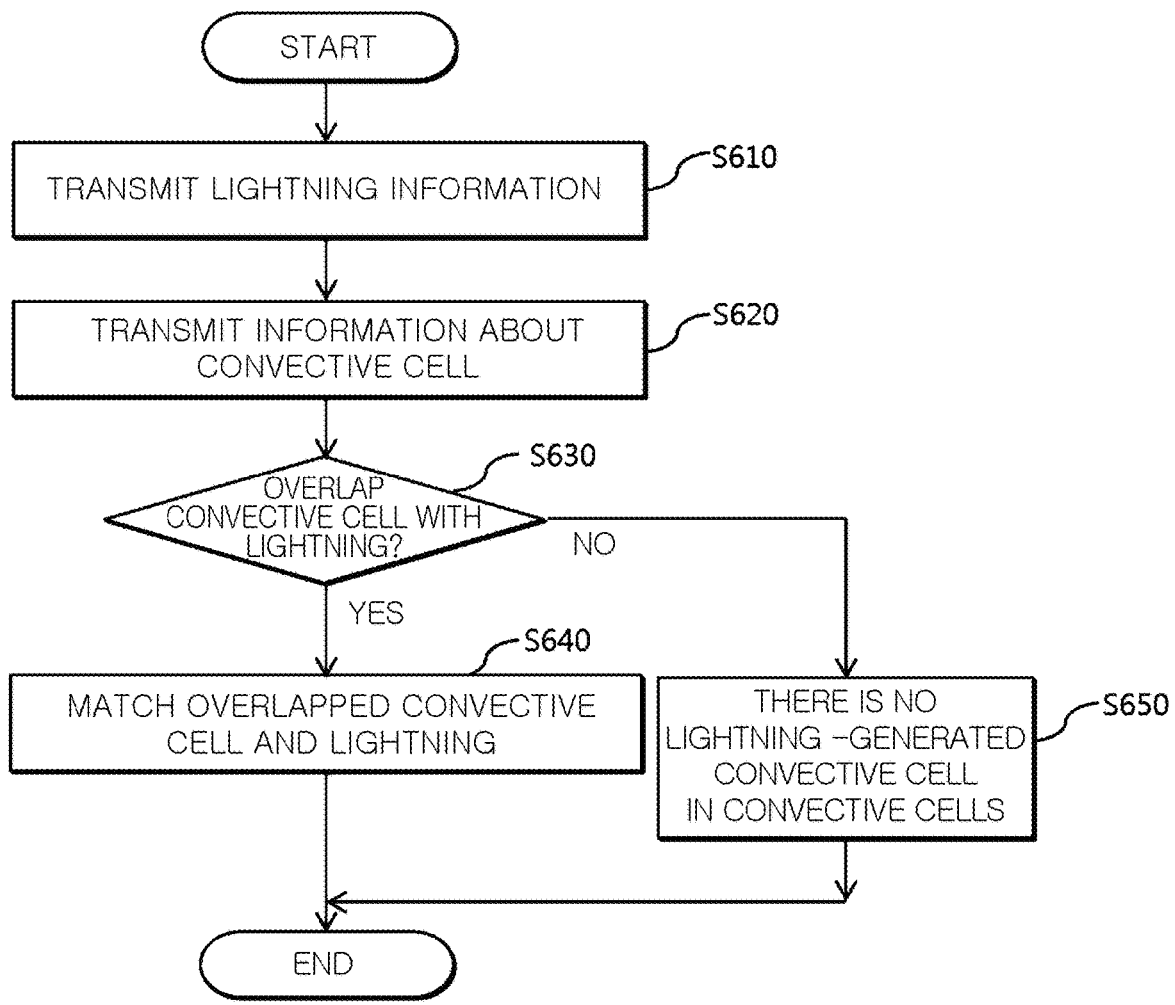
FIG. 6 is a flowchart illustrating a control method of a matching system between a convective cell in a weather radar image and lightning according to an embodiment of the invention.

FIG. 6 is a flowchart illustrating a control method of a matching system between a convective cell in a weather radar image and lightning according to an embodiment of the invention.

First, when lightning is generated, the total lightning detection system 100 detects the generated lightning.

In other words, the total lightning detection system 100 collects data about generated lightning. In addition, the total lightning detection system 100 analyses the collected data about lightning.

In addition, the total lightning detection system 100 transmits the analyzed (or detected) lightning information to the terminal 300.

Figure 7:
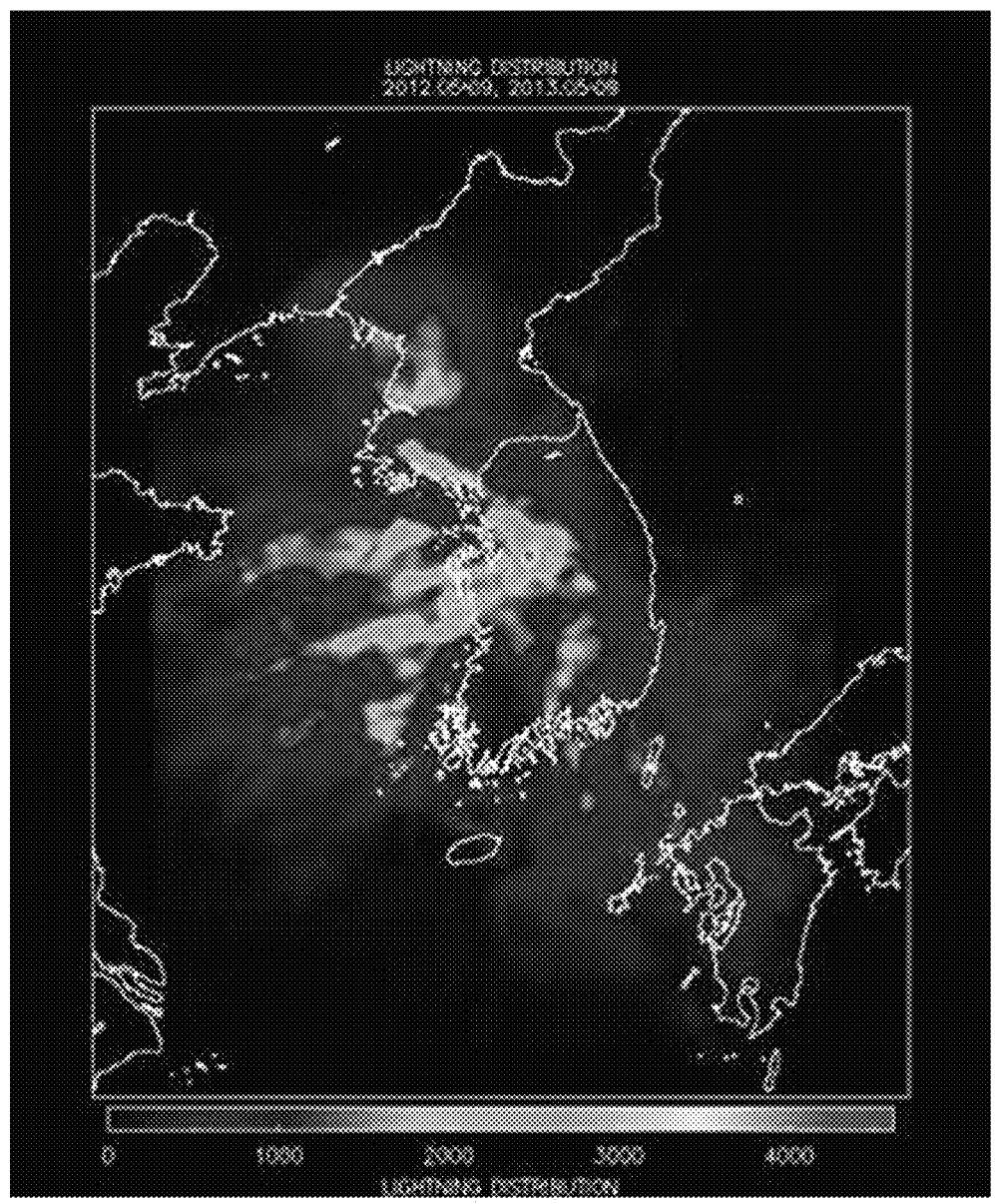
FIG. 7 is a diagram illustrating collected data about a plurality of lightning according to an embodiment of the invention.

For example, as illustrated in FIG. 7, the total lightning detection system 100 collects data about a plurality of lightning generated for a preset period (for example, 10 months), and analyses the collected data about the plurality of lightning.

Figure 8:
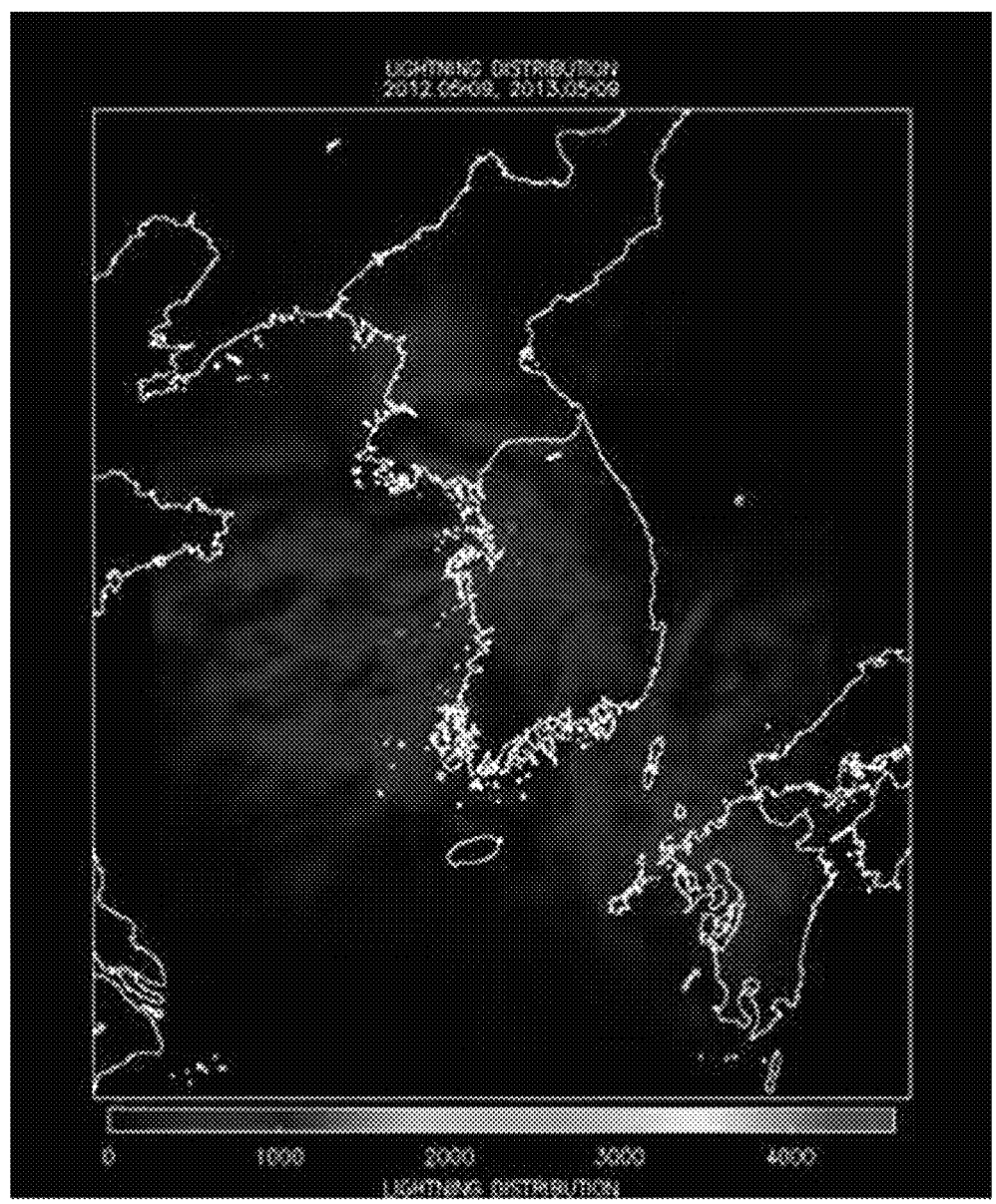
FIG. 8 is a diagram illustrating analyzed lightning information according to an embodiment of the invention.

In addition, as illustrated in FIG. 8, the total lightning detection system 100 transmits the analyzed lightning information to the terminal 300 (S610).

Thereafter, the weather radar center system 200 detects one or more convective cells present in a radar image detected (captured, collected, observed, or sensed) through a weather radar (not illustrated).

In addition, the weather radar center system 200 transmits the information about one or more detected convective cells to the terminal 300.

Figure 9:
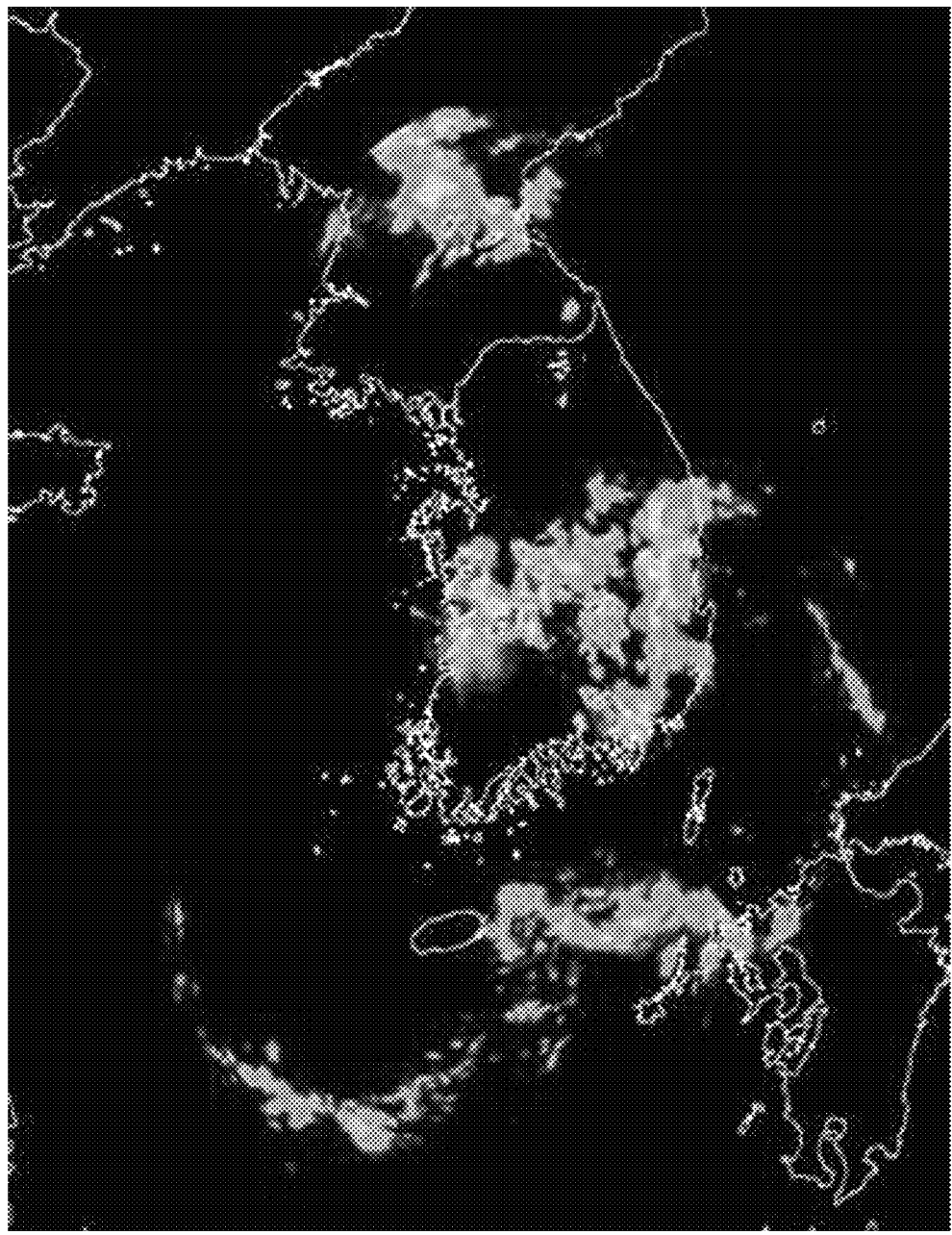
FIG. 9 is a diagram illustrating information about one or more detected convective cells according to an embodiment of the invention.

For example, as illustrated in FIG. 9, the weather radar center system 200 detects one or more convective cells present in the radar image detected through the weather radar, and transmits the information about one or more detected convective cells to the terminal 300 (S620).

Then, the terminal 300 receives the analyzed lightning information transmitted from the total lightning detection system 100.

In addition, the terminal 300 receives the information of one or more detected convective cells transmitted from the weather radar center system 200.

In addition, the terminal 300 confirms (or determines) whether there is a convective cell overlapped with (or including) an ellipse interface of lightning corresponding to the lightning information in the convective cell range included in the received information about one or more convective cells.

Figure 10:
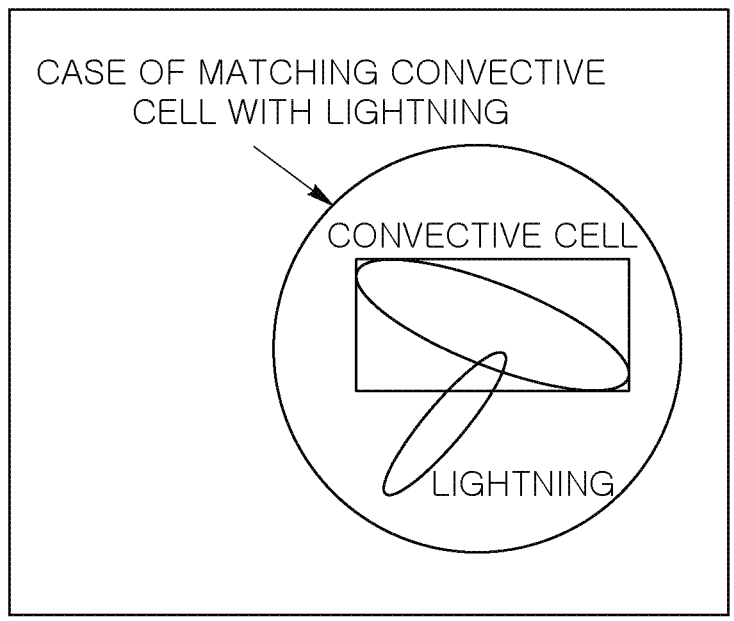
FIG. 10 and FIG. 11 are diagrams illustrating a screen for confirming overlapping between a convective cell and lightning according to an embodiment of the invention.
Figure 11:
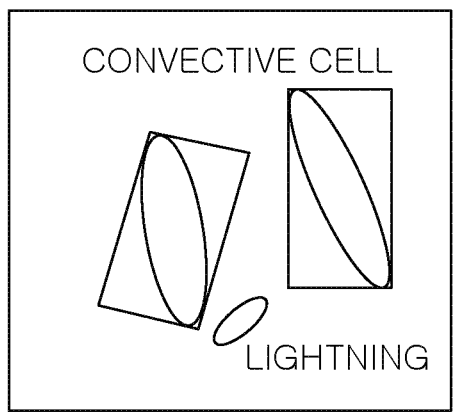

For example, as illustrated in FIG. 10 and FIG. 11, the terminal 300 confirms whether the convective cell range 1011, 1012, or 1013 is overlapped with the lightning 1021 or 1022 (S630).

When there is a convective cell overlapped with an ellipse interface corresponding to the lightning information in one or more convective cell ranges as the confirmation result (or the determination result), the terminal 300 determines that the lightning corresponding to the lightning information is generated from the overlapped convective cell, and matches the lightning information (or the lightning corresponding to the lightning information) with the convective cell.

In addition, the terminal 300 stores the information about the matched lightning information and convective cell. In this case, the terminal 300 may accumulate, store, and display the number of lightning generation times for each convective cell.

For example, as illustrated in FIG. 10, when the convective cell range 1011 is overlapped with the lightning 1021, the terminal 300 determines that the lightning 1021 is generated from the convective cell corresponding to the convective cell range 1011, matches the lightning with the convective cell corresponding to the convective cell range 1011, and stores the information about the matched convective cell and lightning (S640).

In addition, when there is no convective cell overlapped with an ellipse interface of lightning corresponding to the lightning information in one or more convective cell ranges as the confirmation result, the terminal 300 determines that the lightning is not generated in one or more convective cell ranges.

For example, as illustrated in FIG. 11, the lightning 1022 is not overlapped with the convective cell ranges 1012 and 1013, it is determined that the lightning 1022 is not generated in the convective cell ranges 1012 and 1013 (S650).

According to the embodiments of the invention, as described above, convective cells are detected in a weather radar image, lightning is detected through a total lightning detection system, and the detected lightning is matched with the detected convective cells in the weather radar image. Therefore, it is possible to rapidly and accurately match and confirm a lightning-generated convective cell of a plurality of convective cells.

A person skilled in the art can modify and change the above description within the scope which does not deviate from the essential property of the invention. Accordingly, the embodiments disclose in the invention is not to limit the technical spirit of the invention but to describe it, and the scope of the technical spirit of the invention is not limited by such embodiments. The protection scope of the invention should be interpreted by the following Claims, and it should be interpreted that all the technical spirits within the scope equivalent thereto are included in the right scope of the invention.

According to the invention, convective cells are detected in a weather radar image, lightning is detected through a total lightning detection system, and the detected lightning is matched with the detected convective cells in the weather radar image. Therefore, it is possible to rapidly and accurately match and confirm a lightning-generated convective cell of a plurality of convective cells. Accordingly, the invention may be widely used in a convective cell detection field, a storm prediction field, a weather forecasting field, and the like.

What is claimed is:

1. A matching system between a convective cell in a weather radar image and lightning, which matches a convective cell detected in a weather radar image with detected lightning, comprising:
    a total lightning detection system (TLDS) that collects data about generated lightning, analyzes the collected data about lightning, and transmits the analyzed lightning information;
    a weather radar center system that detects one or more convective cells present in a radar image detected through a weather radar, and transmits information about one or more detected convective cells; and
    a terminal that confirms whether there is a convective cell overlapped with an ellipse interface of lightning corresponding to the lightning information in a convective cell range included in the received information about one or more convective cells, determines that the overlapped lightning is generated from the overlapped convective cell when there is the convective cell overlapped with the ellipse interface of the lightning corresponding to the lightning information in one or more convective cell ranges as the confirmation result, and matches the overlapped lightning information with the convective cell.

2. The matching system between a convective cell in a weather radar image and lightning according to claim 1, wherein the total lightning detection system collects data about generated lightning through a TOA (time of arrival) sensor, filters data in which the number of sensors observing a lightning phenomenon is three or more in the lightning data corresponding to a lightning type for cloud and ground as a lightning data type on the basis of properties of the TOA sensor, and transmits the filtered lightning information to the terminal.

3. A control method of a matching system between a convective cell in a weather radar image and lightning, which matches a convective cell detected in a weather radar image with detected lightning, the method comprising:
    collecting, through a total lightning detection system, data about generated lightning, analyzing the collected data about lightning, and transmitting the analyzed lightning information to the terminal;
    detecting, through a weather radar center system, one or more convective cells present in a detected radar image, and transmitting the information about one or more detected convective cells to the terminal;
    confirming, through the terminal, whether there is a convective cell overlapped with an ellipse interface of lightning corresponding to the lightning information in a convective cell range included in the received information about one or more convective cells; and
    determining, through the terminal, that the overlapped lightning is generated from the overlapped convective cell when there is the convective cell overlapped with the ellipse interface of the lightning corresponding to the lightning information in one or more convective cell ranges as the confirmation result, and matching the overlapped lightning information with the convective cell.

4. The control method of a matching system between a convective cell in a weather radar image and lightning according to claim 3, wherein the detecting of one or more convective cells present in the detected radar image includes:
    generating, through the weather radar center system, a 3-dimensional CAPPI (Constant Altitude Plan Position Indicator) through the weather radar center system; and
    distinguishing, through the weather radar center system, a reflectivity cell related to risk weather.

5. The control method of a matching system between a convective cell in a weather radar image and lightning according to claim 4, wherein the generating of the 3-dimensional CAPPI includes:
    collecting radar reflectivity data;
    displaying the collected radar reflectivity data on a polar coordinate system by radar volume data; and
    performing coordinate conversion for the radar volume data.

6. The control method of a matching system between a convective cell in a weather radar image and lightning according to claim 4, wherein the distinguishing of the reflectivity cell related to the risk weather includes:
    determining all grid elements having a reflectivity more than a preset threshold value of reflectivity in 3-dimensional radar reflectivity data, and giving individual identification numbers to all the determined grid elements;
    searching x coordinates and y coordinates of all the grid elements, determines grid elements, the y coordinates of which are the same and the x coordinates are adjacent, as 1-dimensional segments, and giving identification numbers to the determined 1-dimensional segments;
    searching y coordinates of all the 1-dimensional segments, and determining 1-dimensional segments, y coordinates of which are adjacent, as 2-dimensional components;
    searching all the 2-dimensional components in a z direction that is a vertical direction, and determining 2-dimensional components, z coordinates of which are adjacent, as a 3-dimensional reflectivity cell;
    confirming whether there is a value smaller than a volume threshold value in the 3-dimensional radar reflectivity cell;
    excluding, when there is the 3-dimensional component with a volume smaller than the volume threshold value as the confirmation result, the 3-dimensional component with the volume smaller than the volume threshold value in the final determination;
    projecting, when there is a 3-dimensional component with a volume equal to or larger than the volume threshold value as the confirmation result, the 3-dimensional component with the volume equal to or larger than the volume threshold value onto an x-y plane, determining it as a 2-dimensional reflectivity cell, detecting a 3-dimensional reflectivity cell corresponding to a 3-dimensional component with a volume equal to or larger than the volume threshold value as a convective cell;
    calculating 3-dimensional property information and 2-dimensional property information from the 3-dimensional reflectivity cell and the 2-dimensional reflectivity cell; and
    displaying a CMAX (column maximum) image and a storm 2D image on the basis of the detected convective cell and the calculated property information.

\* \* \* \* \*